US010895584B2

(12) United States Patent
Pacheco

(10) Patent No.: US 10,895,584 B2
(45) Date of Patent: Jan. 19, 2021

(54) METHOD OF CONTROLLING A PROBE USING CONSTANT COMMAND SIGNALS

(71) Applicant: Louis Pacheco, La Ville du Bois (FR)

(72) Inventor: Louis Pacheco, La Ville du Bois (FR)

(73) Assignee: CONCEPT SCIENTIFIQUE INSTRUMENTS, Les Ulis (FR)

( * ) Notice: Subject to any disclaimer, the term of this patent is extended or adjusted under 35 U.S.C. 154(b) by 100 days.

(21) Appl. No.: 16/141,413

(22) Filed: Sep. 25, 2018

(65) Prior Publication Data
US 2019/0094267 A1 Mar. 28, 2019

(30) Foreign Application Priority Data

Sep. 25, 2017 (FR) ...................................... 17 58855

(51) Int. Cl.
G01Q 10/06 (2010.01)
G01Q 60/28 (2010.01)
(Continued)

(52) U.S. Cl.
CPC ........... *G01Q 10/065* (2013.01); *G01Q 20/04* (2013.01); *G01Q 60/26* (2013.01); *G01Q 60/28* (2013.01); *G01Q 60/30* (2013.01); *G01Q 60/38* (2013.01)

(58) Field of Classification Search
CPC ...... G01Q 10/065; G01Q 60/38; G01Q 20/04; G01Q 60/26; G01Q 60/30; G01Q 60/28
See application file for complete search history.

(56) References Cited

U.S. PATENT DOCUMENTS 5,229,606 A 7/1993 Elings et al.
5,440,121 A * 8/1995 Yasutake ................ B82Y 35/00
850/1
(Continued)

FOREIGN PATENT DOCUMENTS

WO 2012/078415 A2 6/2012

OTHER PUBLICATIONS

Rapport de Recherche Préliminaire / Opinion Écrite, dated Jun. 5, 2018, issued in priority French Application No. 1758855, filed Sep. 25, 2017, 8 pages.
(Continued)

Primary Examiner — Brooke Purinton
(74) Attorney, Agent, or Firm — Christensen O'Connor Johnson Kindness PLLC

(57) ABSTRACT

A method for commanding a tip of a probe is disclosed, wherein a command signal, representative of the force applied by said tip on the surface of a sample to be analyzed, includes at least one cycle successively defined by: a first step where the value of said command signal decreases from a maximum value (Smax) to a minimum value (Smin) so as to move said tip away from said surface at a predetermined distance called detachment height; a second step where the value of the command signal is maintained constant at said minimum value so as to maintain the tip at said detachment height; a third step where the value of the command signal increases from the minimum value up to said maximum value so as to bring the tip closer towards the surface to be analyzed until the tip comes into contact with the surface; and a fourth step where the value of the command signal is maintained constant at said maximum value to maintain the tip in contact with the surface to be analyzed under a constant force between the tip and the surface to be ana-
(Continued)

lyzed; the command signal being controlled between two successive steps to avoid any oscillation of the tip.

10 Claims, 2 Drawing Sheets

(51) Int. Cl.
G01Q 60/30 (2010.01)
G01Q 20/04 (2010.01)
G01Q 60/26 (2010.01)
G01Q 60/38 (2010.01)

(56) References Cited

U.S. PATENT DOCUMENTS

| | | | |
|---|---|---|---|
| 5,866,806 A * | 2/1999 | Samsavar | G01B 7/34 |
| | | | 73/105 |
| 2006/0113469 A1 | 6/2006 | Baba et al. | |
| 2007/0266780 A1 * | 11/2007 | Baba | B82Y 35/00 |
| | | | 73/105 |
| 2018/0088148 A1 * | 3/2018 | Hirade | G01Q 20/02 |

OTHER PUBLICATIONS

Cappella, B., et al.,"Force-distance curves by atomic force microscopy," Surface Science Reports 34, Jan. 1, 1999, 103 pages.

\* cited by examiner

METHOD OF CONTROLLING A PROBE USING CONSTANT COMMAND SIGNALS

The invention relates to the field of measuring local properties of a surface.

More specifically, the invention relates to the field of measurements of local properties of a surface using a tip of a probe, this probe being for example a micrometric probe, a nanometric probe, or an atomic force microscope (generally named under the acronym AFM for "Atomic Force Microscopy").

There are different ways to use an AFM microscope.

Thus, an AFM microscope can be used in a so-called "contact" mode. In this mode, the tip of the probe or of the AFM microscope remains in contact with the surface to be analysed, with a constant force.

When a probe is used in "contact" mode, numerous measurements can be carried out, including but not limited to, measurements of the local electrical resistance of the surface, local thermal measurements or measurements of local hardness or adhesion. For this purpose, a tip whose properties are suited to the desired, thermal, mechanical or electrically-conductive measurement associated with the atomic force microscope.

In "contact" mode, the tip of the probe can be maintained in contact with the surface to be analysed to perform a measurement of the local electrical resistance, which is accurately quantifiable by maintaining a constant force between the tip and the surface.

For example, reference can be made to document FR 2 959 824. This document proposes a device to perform a measurement of the local electrical resistance of a surface.

In "contact" mode, a tip of a probe can also be used to determine the topography of the surface. Indeed, the tip is moved according to a given direction along the surface, and various local measurements are performed during its displacement to obtain the topography of this surface.

However, the use of this "contact" mode to perform topographic measurements remains, in practice, limited to the analysis of so-called "hard" surfaces. Indeed, for so-called "soft" surfaces, such as polymers or biological tissues, the friction of the tip in contact with the surface to be analysed may cause deformations of the surface, or even destroy it.

An operating mode that can be used to analyse the topography of all types of surfaces, soft or hard, is the "intermittent" mode.

In "intermittent" mode, also called "contactless" mode, the tip of a probe can be controlled to oscillate at a frequency close to its resonance frequency.

More specifically, the tip oscillates at a predefined amplitude. By approaching the surface, this amplitude diminishes, mainly because of long distance forces and interaction between the tip and the surface. This oscillation mode of the tip makes it possible to overcome friction problems between the tip and the surface described for the contact mode.

The "intermittent" mode, however, has several disadvantages, in particular with respect to the "contact" mode.

One of its disadvantages is that it does not allow real continuous contact with the surface of the sample. Another disadvantage is that it does not enable to maintain contact under a constant force.

The measurement of local properties of the sample, such as local thermal or electrical resistance, depends in particular on the contact time between the tip and the sample, within a given range of time.

However, in the "intermittent" mode, there is no sufficient time range allowing the probe to remain in contact with the surface to be analysed to perform an accurate and reliable measurement of this local electrical resistance, moreover with a constant force for it to be precise and reliable.

In document US 2007/0114406, a device capable of being associated with an AFM microscope is proposed, wherein the tip oscillates according to a so-called "forced and pulsed" mode.

A topographic measurement can be performed in this so-called "forced and pulsed" mode. Different types of surface, hard or soft, can also be analysed with this mode.

However, an accurate and reliable measurement of the local properties of a sample, for example the local electrical resistance, remains impossible with this "forced and pulsed" mode. Indeed, statically maintaining the tip thanks to a constant force is not possible in this case.

FIG. 1 of document US 2007/0114406 provides more precisely the time-force curve associated with the tip. The tip stays in contact with the surface between the point referenced 1 (t=0.2 milliseconds) and the point referenced 4 (t≈0.27 milliseconds), but with a variable force that does enable reliable measurements of electrical properties.

After the point referenced 4 in FIG. 1 of document US 2007/0114406, the tip oscillates freely and allows a usable measurement of the topography of the surface. Other parameters, such as local stiffness or adhesion, can be deduced from the curve between the points referenced 1 and 4.

Thus, the known modes of the state of the art make it possible to carry out several types of quantitative measurements separately, but not simultaneously. Thus, it is not possible to simultaneously perform quantitative mechanical measurements and quantitative electrical measurements, nor is it possible to perform simultaneously quantitative mechanical measurements and quantitative thermal measurements.

In other words, to date, and to the applicant's knowledge, it is not possible to, reliably, simultaneously perform measurements of the local properties of a surface, for example a thermal measurement or an electrical measurement, such as a measurement of local electrical resistance, and mechanical properties of this surface, for example a measurement of the topography or of the adhesion force.

To meet this demand, it would be interesting to be able to perform such measurements, in a reliable manner and along the same course of the tip along a displacement line on the surface to be analysed. This would result especially in mechanical and electrical measurements, among others, which would be obtained more quickly than today.

An object of the invention is to respond to this demand.

Therefore, the invention proposes a method for commanding an actuator of a tip of a probe, wherein the command signal, representative of the force applied by said tip on the surface of a sample to be analysed, comprises at least one cycle successively defined by:

- a first step where the value of said command signal decreases from a maximum value to a minimum value so as to move said tip away from said surface to be analysed at a predetermined distance called detachment height;
- a second step where the value of the command signal is maintained constant at said minimum value so as to maintain the tip at said detachment height;
- a third step where the value of the command signal increases from a minimum value up to said maximum value so as to bring the tip towards the surface to be analysed until the tip comes into contact with the surface; and a fourth step where the value of the command signal is maintained constant at said maximum value so as to maintain the tip in contact with the surface to be analysed;

the command signal being controlled between two successive steps to prevent, on the one hand, any oscillation of the tip and to maintain, on the other hand, maintain a constant force between the tip and the surface to be analysed when the tip is in contact with the surface to be analysed.

Moreover, methods for commanding the tip of a probe known according to the state of the art only enable to scan a surface in a continuous manner. A disadvantage of these command methods is that when the tip of the probe is in contact with the surface to be analysed, the resulting friction of this contact modifies the measurements performed by the probe and alters the results achieved, especially in the case of electrical measurements.

Furthermore, known modes according to the state of the art cannot be used to achieve quantitative measurements at a high scanning speed, for example at a scanning speed of one line per second or more.

The present invention makes it possible to perform measurements on all types of surface, especially so-called "hard" surfaces or so-called "soft" surfaces, flexible or even fragile. These types of surfaces include semi-conductors, solar cells, organic semi-conductors, conducting polymers, organic polymers or thermoplastic polymers such as poly(methyl methacrylate) (generally named as PMMA). The invention also makes it possible to perform measurements on surfaces such as carbon nanotubes or metallic nanoparticles.

Thanks to maintaining a constant force and to the absence of oscillation, the command of an actuator for the tip of an atomic force microscope according to one embodiment of the present invention allows quantitative measurements of the thermal, electrical and mechanical type, and topographic measurements of a sample during at least one cycle of the method.

In particular, the invention enables the implementation of a new "jump" mode capable of solving the aforementioned disadvantages of the "contact" mode and "intermittent" mode for the analysis of samples by means of an atomic force microscope.

Advantageously, the invention can be implemented to command the tip of a probe, either when the tip is in contact with the surface of a sample to be analysed, or when the tip is not in contact with the surface of the sample.

Advantageously, the invention makes it possible to perform measurements which are quantitative, these measurements being simultaneously mechanical measurements, quantitative electrical measurements, and quantitative thermal measurements.

Advantageously, the invention can be implemented with a scanning speed of one line per second, and of more than one line per second.

Advantageously, the invention enables to eliminate the effects of friction when carrying out measurements on samples, without moving them and maintaining the measurement with a control on the force applied to them. This enables the invention to perform measurements on very small samples and biological samples, such as bio-polymers, macromolecules, nanoparticles, micro particles, cells, bacteria or deoxyribonucleic acid.

Advantageously, the invention also makes it possible to perform such measurements on flexible, fragile and/or delicate samples without damaging the surface of these samples.

The method according to the invention can also comprise one at least of the following characteristics, taken individually or in combination:

the first step of the cycle comprises a first sub-step of progressive acceleration during which the command signal implements an increasing tip speed, and a third sub-step of progressive deceleration during which the command signal implements a decreasing tip speed;

the first step of the cycle comprises after the first sub-step of the first step of the cycle and before the third sub-step of the first step of the cycle, a second sub-step of zero acceleration during which the command signal moves the tip away from the sample at a constant speed;

the command signal implements to the tip a non-zero speed of less than 400 micrometres per second during the first step of the cycle;

the third step of the cycle comprises a first sub-step of progressive acceleration during which the command signal implements to the tip an increasing speed, and a third sub-step of progressive deceleration during which the command signal implements to the tip a decreasing speed;

the third step of the cycle comprises after the first sub-step of the third step of the cycle and before the third sub-step of the third step of the cycle, a second sub-step of zero acceleration during which the command signal brings the tip P closer to the sample at a constant speed;

the command signal implements to the tip a non-zero speed of less than 400 micrometres per second during the third step of the cycle;

the command signal implements to the tip, during at least one of the four steps of the cycle, a displacement along the surface to be analysed;

the command signal implements to the tip, during at least the second step of the cycle, a displacement along the surface to be analysed;

smoothing of the command signal between the different steps is achieved by means of an electronic filter.

The invention will be better understood, and other purposes, advantages and characteristics of it will appear more clearly from reading the following description and which is made with reference to the appended drawings, on which:

FIG. 1 is a general diagram of a device 100 according to the invention.

Figure 1:
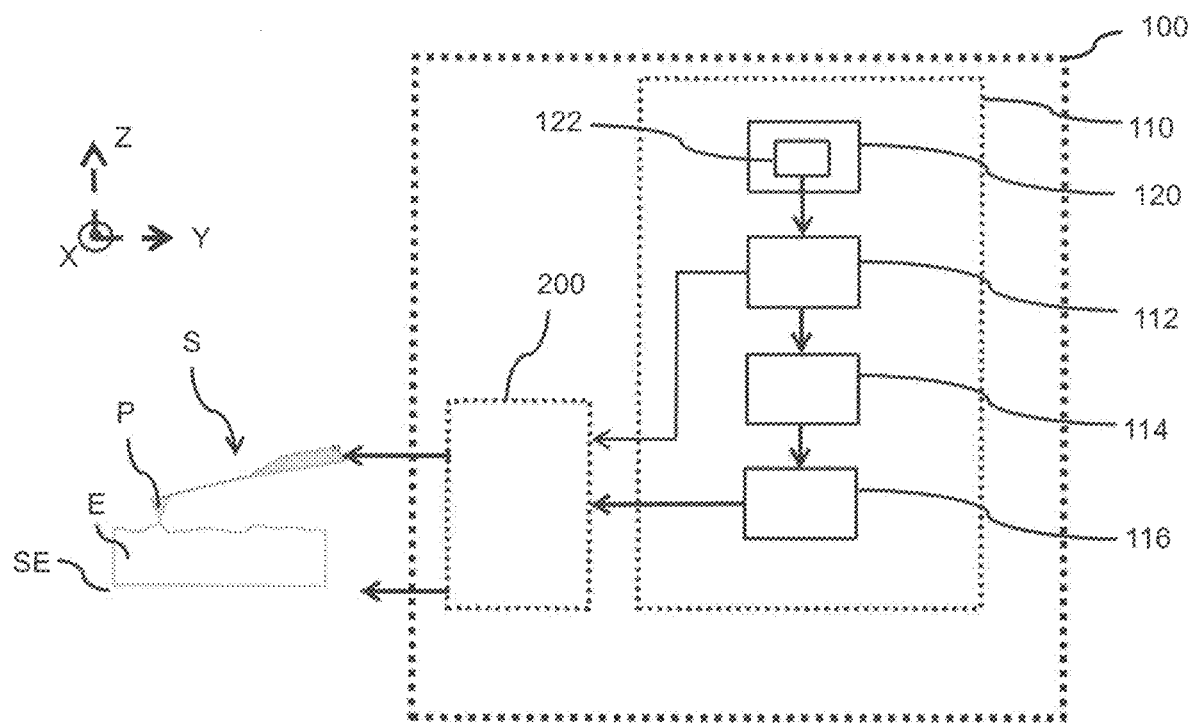
FIG. 1 is a general diagram of a device according to the invention.

More specifically, FIG. 1 illustrates the analysis of the surface of a sample E using a probe S at nanometric and micrometric scales, for example an AFM microscope. The probe S comprises a tip P and can be commanded by means of a command method according to one embodiment of the invention.

For the following description, it should be understood that the surface of the sample E defines an orthogonal system XY where the horizontal directions X and Y define a so-called "horizontal" plane. This horizontal plane is perpendicular to a direction Z which defines the vertical direction.

It will also be understood in the following description, that a displacement along the surface is a displacement carried out according to the XY orthogonal system, according to the direction X, according to the direction Y, or according to the direction X and direction Y simultaneously.

According to one embodiment of the invention, the displacement of the tip P can be commanded so as to move the tip according to the X direction, according to the Y direction, according to the Z direction, or according to several of these directions.

Advantageously, the tip P can be moved on top of the surface of the sample E to scan this surface according to the horizontal directions X and Y.

According to one embodiment of the invention, the tip P can be commanded so as to remain static, for example to immobilise the displacement of the probe S according to one of the three orthogonal directions X, Y, Z, according to two of the directions X, Y, Z or according to all three directions X, Y Z.

As a variant, the sample E can be displaced according to one or several of the three orthogonal directions X, Y, Z by means of a mobile support SE on which this sample is placed.

According to one embodiment of the invention, the detachment height of the tip P is greater than zero and smaller than 200 nanometres. The detachment height of the tip P corresponds to the distance separating the tip P from the surface of the sample E according to the vertical direction Z. Advantageously, the detachment height of the tip P can be chosen to be greater than 40 nanometres, and smaller than 150 nanometres, to prevent the adhesion of the tip from to the surface of a biological sample when the method according to the invention is implemented.

The stiffness constant of the tip P must be greater than a tenth of a Newton per metre and smaller than several tens of Newton per metre. Advantageously, the stiffness constant of the tip P is equal to 40 Newtons per metre to analyse the surface of a "flexible" sample or of a fragile sample without damaging the surface of the sample when the tip P is in contact with the surface of the sample E.

The resonance frequency of the tip P can be greater than 10 kilohertz and of less than 1 megahertz. Advantageously, the resonance frequency of the tip P is greater than 70 kilohertz and of less than 300 kilohertz to analyse the surface of a "flexible" surface or of a fragile surface with an optimal sensitivity.

According to one embodiment of the present invention, the stiffness constant and the resonance frequency of the tip P are selected in the aforementioned intervals to avoid excessive adhesion between the tip P and the surface of the sample E when the tip P is far from this surface. Advantageously, the choice of these values also makes it possible to limit the friction between the tip P and the surface of the sample E when the tip P is brought into contact with this sample.

According to one embodiment of the invention, the detachment height, the stiffness constant and/or the resonance frequency of the tip P can be modified during the cycle of the command method, for example during a given step of this cycle.

Moreover, it should be understood that the previous tip is provided solely as an example, and that all tips known by the state of the art can be applied to the present invention.

In FIG. 1, and according to an embodiment of the invention, the device 100 is electrically connected to the probe S. The device 100 comprises an analogue module 110 configured to command the probe S by means of a command signal, for example an electric voltage, and/or for measuring an electrical signal measured by the probe S. In particular, the movement of the probe S can be commanded.

According to one embodiment of the invention, the displacement of the probe S can be commanded so as to move the probe according to the horizontal X direction, according to the horizontal Y direction, according to the vertical Z direction, or according to several of these directions simultaneously.

According to one embodiment of the invention, the analogue module 110 comprises a software interface 120, this software interface may comprise a control and measurement system 122.

According to one embodiment of the invention, the control and measurement system 122 comprises a control command of the command signal transmitted to the probe S. The control and measurement system 122 makes it possible to control the directions and the speed at which the probe S moves by means of this command signal.

According to one embodiment of the invention, the control and measurement system 122 makes it possible to control the directions and the speed at which the probe S moves my means of this command signal.

In a variant, the control and measurement system 122 can be used to move the sample E along one or several directions X, Y and Z.

The control and measurement system 122 can also enable the application of an electrical signal, for example an electric voltage, between the tip P of the probe S and the sample E.

According to one embodiment of the invention, the analogue module 110 that comprises the device 100 comprises, in addition to the software interface 120, a digital signal processor 112, a voltage source 114 and a filter 116, interconnected and configured to command the displacement of the tip P according to one or several directions. Thus, the device 100 is configured to transmit a command signal from the control and measurement system 122 to the digital signal processor 112, then to the voltage source 114 to command the production of a voltage, then to the filter 116.

Advantageously, the voltage source 114 is a high voltage source that can provide a voltage comprised between one hundred volts and several thousand volts.

Advantageously, the filter 116 is a bandpass filter configured to eliminate low frequencies and/or high frequencies of the electrical signal applied between the tip P of the probe S and the sample E.

According one embodiment of the invention, the analogue module 110 can comprise one or several analogue-digital converters.

According to one embodiment of the invention, the device 100 comprises a controller 200 configured to implement a displacement command of the probe S and/or to command the carrying out of a measurement via this probe S.

According to one embodiment of the invention, the controller 200 is electrically connected to the analogue module 110 to enable the transmission of a signal received from the digital signal processor 112 and/or from the filter 116.

The controller 200 can comprise control means, for example a processor, configured to implement the steps of a method according to one embodiment example of the invention.

The controller 200 can be configured to implement a displacement command of the mobile support SE derived from a command signal.

According to one embodiment of the invention, the mobile support SE is configured to receive a command signal from the controller 200.

The probe S can be maintained in contact with the surface of the sample E by means of the application of a constant force, so as to make no scanning of the surface of the sample E.

The invention can thus be used in "static" mode when the displacement of the tip P is solely commanded according to the horizontal X direction or according to the horizontal Y direction.

Advantageously, the displacement of the probe S can be immobilised according to one or more of the three directions X, Y, Z, when the tip P is in contact with the surface of the sample E.

In a variant, the probe S can be maintained at a given distance from the surface of the sample E without undergoing a displacement according to the direction Z. The probe S can be simultaneously moved along the surface of the sample E.

The invention can thus be used in "sequential" mode when the displacement of the tip P is solely commanded according to the horizontal X direction, according to the horizontal Y direction or according to the vertical Z direction.

Advantageously, the tip P can be maintained static or it can perform a scan of the surface of the sample.

In a variant, the tip P can be maintained static or not with the sample E when the surface of the sample E is moved according to one of the three orthogonal directions X, Y, Z, according to two of the directions X, Y, Z or according to all three directions X, Y Z.

Figure 2:
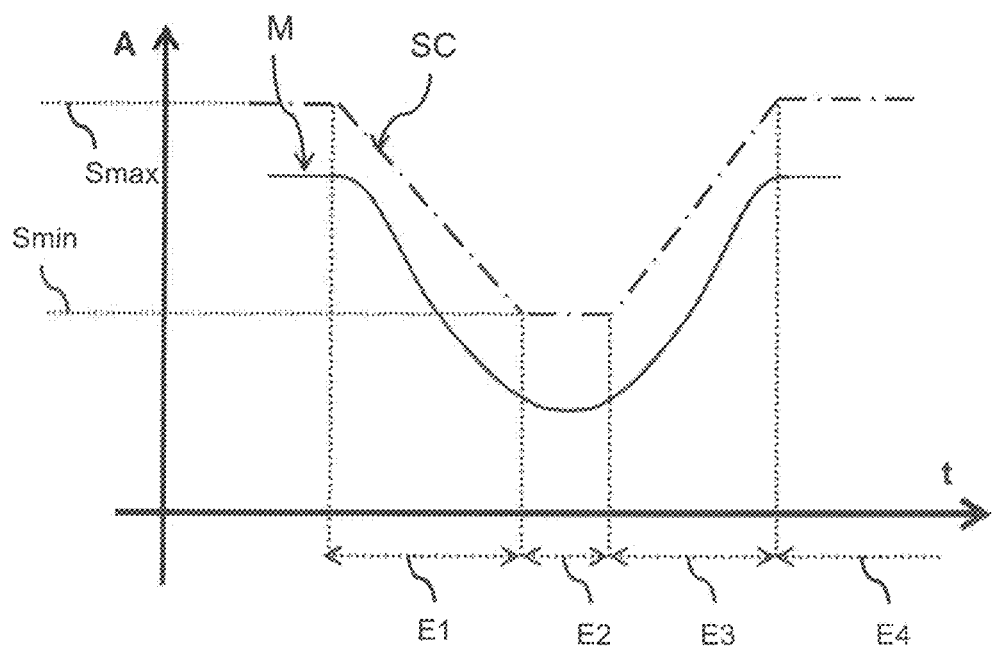
FIG. 2 is a diagram representative of the amplitude of a signal commanding the displacement of the tip during the different steps of the method according to the invention.

FIG. 2 represents an example of movement of the tip P that can be obtained when a command method is implemented according to one embodiment of the invention. More specifically, the command signal SC corresponds to the amplitude of the voltage applied to command an actuator of the probe S to move the probe S, and thus the tip P at a predetermined distance above the surface of the sample E, or to a point of contact with it.

In the following description, it should be understood that the value of the command signal SC thus determines the movement of the tip P and is thus representative of this movement.

The curve M represents the deflection of an actuator lever during an AFM measurement. This actuator is, for example, a piezoelectric actuator configured to manage the movements of the probe S or of the tip P with respect to the sample. In particular, the curve M can correspond to the amplitude of the movement of the tip P over time.

According to one embodiment of the invention, the tip P is initially in contact with the surface of the sample E to be analysed.

During the first step E1, the tip P is commanded by the signal SC to the detach from the surface of the sample E. This detachment occurs perpendicularly to the surface of the sample, so as to move the tip P away from the first point of the surface, without any lateral displacement.

The detachment of the tip P during the first step E1 is performed in a controlled manner using the command signal SC. This control avoids the natural oscillations of the tip P and, incidentally, also allows to avoid any damage to the surface to be analysed. Indeed, when the tip P oscillates, which is not the case here, the natural oscillation of the tip can cause a contact with the surface.

The command signal SC transmitted to the actuator of the probe S can be a sinusoidal voltage signal, semi sinusoidal, rectangular, or any other type suitable for the implementation of the invention. The particular form of the command signal SC makes it possible to obtain a particularly advantageous form of displacement of the tip P, and thus to obtain the advantages claimed by the invention.

During this first step E1, the tip P detaches from the surface for a period of time that can vary between 100 microseconds and 500 microseconds. For a detachment of the tip P at a detachment distance of 80 nanometres, the tip P detaches from the surface for a time period of approximately 300 microseconds.

This detachment occurs by setting the tip P in motion during a phase of progressive acceleration to avoid an oscillation of the probe S. This phase of progressive acceleration is implemented by the controller 200, and can be of a duration of the order of 20 microseconds.

According to one embodiment of the invention, the displacement of the probe S is performed by reducing the command signal SC during the deceleration phase, so as to move the probe S away from the sample E. The command signal SC is thus reduced from a maximum value Smax to reach a minimum value Smin.

According to one embodiment of the invention, the maximum value Smax and the minimum value Smin are electric voltage values chosen from a range of values greater than 0 Volts and smaller than 10 Volts with respect to the voltage of the sample E.

By way of non-limiting example, the maximum value Smax of the command signal SC can be of the order of 3.5 Volts, and the minimum value Smin of the command signal SC can be of the order of 2.5 Volts. A controlled decrease of the command signal SC from 3.5 Volts to 2.5 Volts allows the device 100 to move the probe S, at a distance of approximately 100 nanometres, for example 80 nanometres, away from the sample E. This controlled decrease further enables to reduce the motion and oscillation of the tip P of an AFM microscope whose parameters such as the stiffness constant, the resonance frequency, etc. are selected to analyse the surface of a "flexible" or fragile sample.

During the implementation of the method, the detachment height of the tip P corresponding to the distance separating the tip P from the sample E can be selected in a non-limiting manner in a range comprised between 0 and 500 micrometres.

The distance defining how far the tip P is from the surface to be analysed is defined as the detachment height of the command method.

According to a first example of application, the detachment height of the tip P can be selected from a range comprised between 1 nanometre and 200 nanometres for "flexible" samples, fragile samples, or samples that present significant adhesion effects.

According to another example of application, the detachment height of the tip P can be greater than 1 micrometre, and smaller than 50 micrometres, to analyse biological samples.

The value of the command signal SC enabling to maintain the tip P in contact with the surface to be analysed at constant force is defined as being the set value of the command method.

By way of non-limiting example, the detachment height of the tip P can be modified during one or more steps of the method.

Moreover, the command signal SC of the actuator can be decomposed into several sub-steps to control the acceleration, the deceleration and the displacement speeds of the actuator, of the probe S or of the tip P.

Advantageously, the control of the acceleration, of the deceleration and of the displacement speeds enables to dampen any oscillation effect.

For this purpose, and according to one embodiment of the invention, the first step E1 comprises the following successive sub-steps:

a first sub-step E11 of progressive acceleration for the purpose of avoiding a sudden acceleration of the motion of the actuator or of the probe S, of avoiding an oscillation of the AFM microscope or of a lever moving this AFM microscope, and of avoiding any disturbing or delaying transient phases of the stabilisation of the tip P; this phase E11 is typically of the order of 20 microseconds and can be implemented using an algorithm of the processor that comprises the controller 200;

a third sub-step E13 of progressive deceleration intended to slow the movement of the actuator or of the probe S and to stop its movement while avoiding disruptions and oscillations caused by a sudden stop of the movement; this phase E13 is typically of the order of 20 microseconds and can also be implemented by means of an algorithm of the processor comprised in the controller 200.

According to one example of embodiment of the invention, when the first sub-step E11 is implemented, a progressive acceleration of the tip P is commanded so as to increase the speed thereof from a zero speed to a speed of 300 micrometres per second during a time interval equal to 20 microseconds, this acceleration being of the order of 15 metres per square second.

According to one example of embodiment of the invention, when the third sub-step E13 is implemented, a progressive deceleration of the tip P is commanded so as to reduce the speed of the tip from a speed of 300 micrometres per second to a zero speed during a time interval equal to 20 microseconds, this deceleration being of the order of −15 metres per square second.

The first step E1 can also comprise, after the first sub-step E11 and prior to the third sub-step E13, a second sub-step E12 of zero acceleration during which the tip P is moved away from the sample E with a constant speed; according to one embodiment of the invention, the value of the commanded constant speed of the tip P is greater than 200 micrometres per second and of less than 400 micrometres per second; in a non-limiting manner, the commanded speed of the tip P is adapted according to the distance to be travelled and according to the measurement time; for example, to move the tip P by 60 nanometres in a time interval equal to 260 microseconds, the displacement speed of the tip P is adjusted to be of the order of 240 micrometres per second.

At the end of the first step E1, the tip P is located at a predetermined distance from the contact surface and at the level of the first measurement point.

Following the first step E1, a second step E2 is implemented, during which the value of the command signal SC is maintained constant at the minimum value Smin so as to maintain the tip P at a fixed detachment height.

According to one embodiment of the invention, one or several measurements can be achieved during the second step E2 thanks to the tip P. Especially, measurements can be performed at different detachment distances from the surface of the sample E. In a non-limiting manner, it is thus possible to measure the electrical resistance, the electrical impedance, the electrical capacitance or the temperature of the sample E at a given distance. Advantageously, a measurement performed without contact between the tip P and the sample E enables to characterise the thermal noise or the electrical noise in the environment of the sample E. During the second step E2, it is thus possible, for example, to perform a measurement of the capacitance of the environment.

These mechanical or electrical measurements can be performed when the tip P is located at different distances from the surface of the sample E, or when the tip is in contact with the surface of the sample E.

During the second step E2, the tip P is maintained at a constant distance from the surface of the sample for a predetermined period of time. This period of time can be of several nanoseconds or of several microseconds, for example 70 microseconds, depending on the nature of the measurement to be performed.

According to one embodiment of the invention, a lateral displacement of the probe S and/or of the tip P can be performed towards another measurement point. The position of the sample E can also be modified with respect to the position of the tip P so as to define a new measurement point.

At the end of this second step E2, a third step E3 is implemented by means of an SC signal to bring the tip P closer to the surface of the sample E. This convergence is made perpendicularly to the surface, without lateral movement.

Here again, as for the first step, the control of the movement of the tip P is carried out so that the tip does not present any natural oscillation.

During this step, a mechanical measurement can be performed, for example a hardness measurement.

It is also conceivable to measure the impedance variation associated with the change of distance between the tip and the contact surface.

The control of the approach movement therefore allows the tip to come into contact with the surface without the interaction between the tip and the surface causing an oscillation of the tip or deterioration of the surface.

Incidentally, this avoids damaging the contact surface.

Putting the tip into contact with the surface, in a controlled manner, avoids the surface to be damaged, in this case at a second measurement point.

According to one embodiment of the invention, the third step E3 comprises a first sub-step E31 and a third sub-step E33 similar to the first sub-step E11 and the third sub-step E13, respectively.

According to one example of embodiment of the invention, a progressive acceleration of the tip P is commanded during the first sub-step E31 so as to increase the speed thereof from zero speed to a speed of 300 micrometres per second during a time interval of 20 microseconds; a progressive deceleration of the tip P is commanded during the third sub-step E33 so as to decrease the speed thereof from a speed of 300 micrometres per second to zero speed during a time interval equal to 20 microseconds.

According to one example of embodiment of the invention, when the third sub-step E13 is implemented, a progressive deceleration of the tip P is commanded so as to reduce the speed of the tip from a speed of 300 micrometres per second to zero speed during a time interval equal to 20 microseconds, this deceleration being of the order of −15 metres per square second.

The third step E3 can also comprise, after the first sub-step E31 and prior to the third sub-step E33, a second sub-step E32 of zero acceleration during which the tip P is brought closer to the sample E, with a constant speed.

The command signal SC transmitted to the actuator of the probe S during the third step E3 can have the same signal form as the signal transmitted during the first step E1, or may be of a different form. Different signal forms enable to achieve different combinations of displacements and measurements of the probe S depending on the nature of the sample E to be analysed.

According to one embodiment of the invention, the displacement of the probe S is performed by increasing the command signal SC during the acceleration phase, so as to bring the probe S closer to the sample E. The command signal SC is thus increased from a minimum value Smin, for example 2.5 Volts, to a maximum value Smax, for example of 3.5 Volts.

Following the third step E3, a fourth step E4 is implemented to maintain the tip P in contact with the surface of the sample E to be analysed, with a constant force and during a predetermined period of time.

The contact between the tip and the surface being made with a constant force, this allows a reliable and quantitative measurement of the local electrical properties of the sample E, for example the contact resistance, at the level of this second measurement point.

Different measurements can therefore be performed at the first measurement point and at the second measurement point, among which a topographic measurement.

According to one embodiment of the invention, the command method implements to the tip P, during the fourth step E4, a displacement along the surface to be analysed while maintaining this tip in contact with the surface. Thus, the cycle of the command method implements a displacement to the tip P along the surface, while simultaneously maintaining the tip P in contact with the surface. This enables to immobilise the displacement of the tip P along the surface, especially along the direction X and/or the direction Y. Advantageously, this embodiment limits the effects of friction between the tip P and the surface of the sample E, which are likely to distort the measurements acquired by the probe S.

Figure 3:
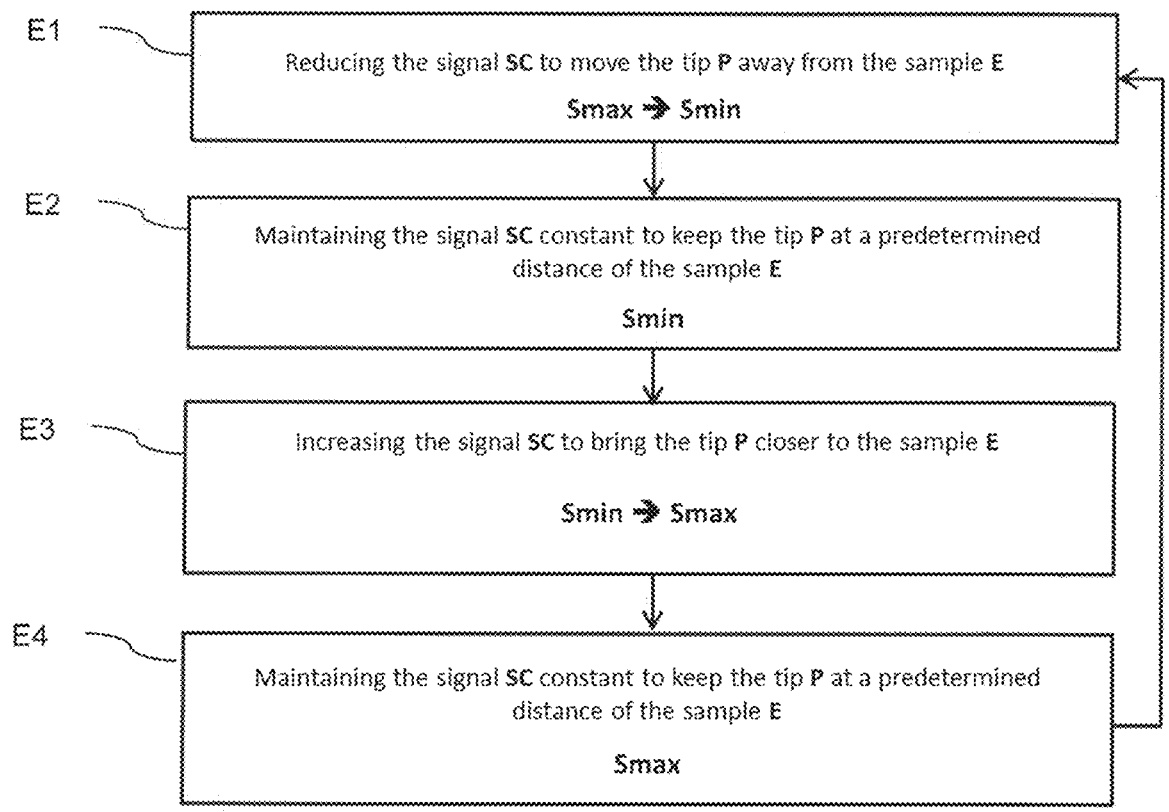
FIG. 3 represents, in flowchart form, the main steps of a method for commanding a tip according to one embodiment of the invention.

In reference to FIG. 3, the steps of the command method described according to one embodiment of the invention are followed when this method is implemented. For example, the probe S is initially located in contact with the sample E.

During the first step E1, the command method implements a decrease of the command signal SC from a maximum value Smax to a minimum value Smin. Under the effect of this decreasing command signal, the probe S is moved away from the sample E at a given distance.

During the second step E2, the command method maintains constant the command signal SC, at a value Smin, so as to maintain the probe S at the same given distance from the sample E.

During the third step E3, the command method implements an increase of the command signal SC from the minimum value Smin to the maximum value Smax. Under the effect of this increasing command signal, the probe S is brought closer to the sample E at a given distance, until possibly coming into contact.

During the fourth step E4, the command method maintains constant the command signal SC, at a value Smax, so as to maintain the probe S at the same distance from the sample E, typically in contact with it.

According to one embodiment of the invention, the command method performs one or more measurements during any one of the previously described steps. The cycle of steps E1, E2, E3 and E4 thus makes it possible to carry out several measurements, especially on soft surfaces, for example plastic or other, without damaging them.

According to one embodiment of the invention, the command method repeats the cycle of steps E1, E2, E3 and E4 following the fourth step E4. The motion of the tip P is thus in the form of a cycle, which is repeated as many times as desires by the user. The resulting command signal SC thus allows to control a dampening of the tip P so as to avoid a natural oscillation of the tip.

It should be noted that the moment when the displacement of the tip P is made from one measurement point to another can be chosen based on the electrical or mechanical measurements that one wishes and/or the desired execution speed, and/or depending on the type of surface to be analysed.

For example, it is possible to move the tip P during the fourth step E4, after having carried out the electrical measurement. In this case, the tip P is in contact with the surface to be analysed, and the displacement of the tip allows a topographic measurement of the entire displacement area of the tip P. Advantageously, this is particularly well suited for measuring the topographic properties of a hard surface even if, to the extent that this displacement is limited, it can also be envisaged for certain soft surfaces.

This enables to obtain more information on the topography, and to accelerate the rate of measurements.

In order to validate the functioning and the non-destructive nature of the command method described above, several types of materials have been analysed by AFM microscopy in the context of topographic and quantitative measurements of the electrical, thermal and mechanical type.

The analyses carried out were performed using a tip having a stiffness constant of approximately 3 nanometres per metre and a resonance frequency of 70 kilohertz. The tip is covered with a conducting material comprising Iridium-Platinum (Pt—Ir) to ensure the electrical characterisation of the analysed materials. The detachment height of the tip was adjusted to 80 nanometres.

Among the different types of samples used, the following can be mentioned:
- a first sample consisting of a polymer material, of the "flexible" type, for a topographic measurement;
- a second sample made of a conducting material, whose electrical properties are known, to demonstrate the correlation of electrical measurements performed in "contact" mode and electrical measurements performed in "jump" mode according to one embodiment of the invention; and
- a third sample consisting of a conducting material of the "flexible" type, whose electrical properties are known, to demonstrate the non-destructive nature of the method during a topographic measurement and during an electrical-type measurement.

Figure 4:
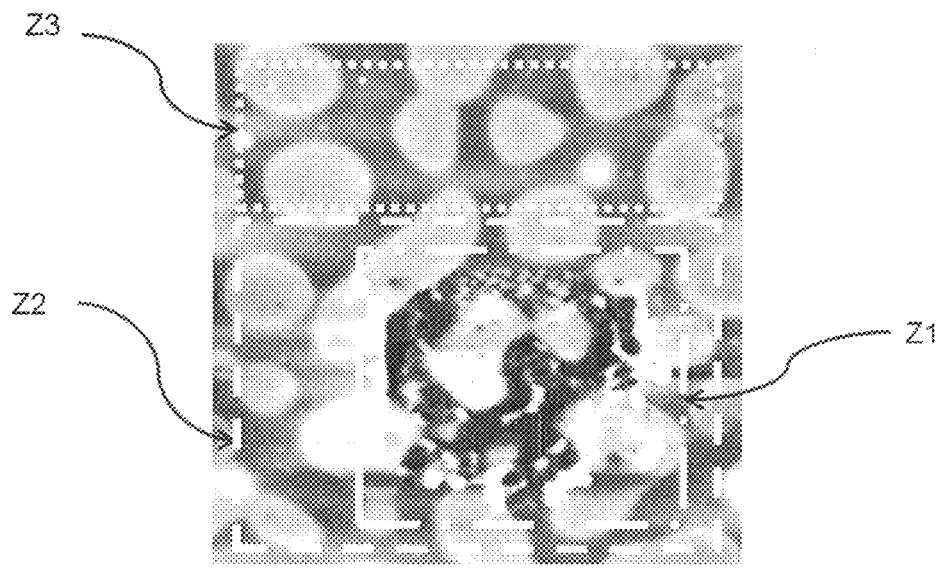
FIG. 4 is a measurement result from a first sample by means of the command method according to one embodiment of the invention.

FIG. 4 represents the surface of a first flexible sample made of poly(methyl methacrylate), and analysed using an AFM microscope.

This analysis comprises a measurement in "contact" mode, a measurement in "intermittent" mode, and a measurement in "jump" mode according to the method and the device according to the invention.

In a first step, a local measurement is performed in "contact" mode on a surface Z1 of 20 microns by 20 microns of the material.

At the end of this measurement in "contact" mode, it is possible to use the AFM microscope to observe localized damage to the surface Z1 due to a friction effect between the tip and the sample during scanning of the tip.

By using the AFM microscope in "intermittent" mode, a topographic image of the sample is then recorded onto a surface Z2 surrounding the area Z1. The image obtained confirms that the measurement in "contact" mode has, indeed, damaged the area Z1 within the area Z2.

Following this imaging in "intermittent" mode, a local measurement is performed in "jump" mode on a surface Z3 of the sample by implementing the steps E1, E2, E3 and E4 of the command method. The area Z3 being located away from the areas Z1 and Z2.

Finally, the AFM microscope is used in "intermittent" mode to record an image with a resolution of 512 pixels by 512 pixels, with a scanning speed of 1 line per second, and comprising all the areas Z1, Z2 and Z3 of the sample. The image obtained makes it possible to observe that no additional damage has been caused to the sample during the implementation of the "jump" mode in the area Z2.

The results also confirm the possibility of performing several types of measurement during the same analysis of a sample, these measurements not damaging the sample, unlike the "contact" mode, when the movement of the tip of the AFM microscope is commanded by a command method according to one embodiment of the invention.

The invention claimed is:

1. A method for commanding a tip of a probe, wherein the command signal, representative of the force applied by said tip on the surface of a sample to be analyzed, comprises at least one cycle successively defined by:
   a first step where the value of said command signal decreases from a maximum value (Smax) to a minimum value (Smin) so as to move said tip away from said surface at a predetermined distance called detachment height;
   a second step where the value of the command signal is maintained constant at said minimum value so as to maintain the tip at said detachment height;
   third step where the value of the command signal increases from a minimum value up to said maximum value so as to bring the tip towards the surface to be analyzed until the tip comes into contact with the surface; and
   a fourth step where the value of the command signal is maintained constant at said maximum value so as to maintain the tip in contact with the surface to be analyzed under a constant force between the tip and the surface to be analyzed;
   the command signal being controlled between two successive steps such that no oscillation of the tip occurs.

2. The method according to claim 1, wherein the first step of the cycle comprises a first sub-step of progressive acceleration during which the command signal implements an increasing tip speed, and a third sub-step of progressive deceleration during which the command signal implements a decreasing tip speed.

3. The method according to claim 2, wherein the first step of the cycle comprises after the first sub-step of the first step of the cycle and before the third sub-step of the first step of the cycle, a second sub-step of zero acceleration during which the command signal moves the tip away from the sample at a constant speed.

4. The method according to claim 1, wherein the command signal implements to the tip a non-zero speed of less than 400 micrometers per second during the first step of the cycle.

5. The method according to claim 1, wherein the third step of the cycle comprises a first sub-step of progressive acceleration during which the command signal implements to the tip an increasing speed, and a third sub-step of progressive deceleration during which the command signal implements to the tip a decreasing speed.

6. The method according to claim 5, wherein the third step of the cycle comprises after the first sub-step of the third step of the cycle and before the third sub-step of the third step of the cycle, a second sub-step of zero acceleration during which the command signal brings the tip closer to the sample at a constant speed.

7. The method according to claim 1, wherein the command signal implements to the tip a non-zero speed of less than 400 micrometers per second during the third step of the cycle.

8. The method according to claim 1, wherein the command signal implements to the tip, during at least one of the four steps of the cycle, a displacement along the surface to be analyzed.

9. The method according to claim 1, wherein the command signal implements to the tip, during at least the second step of the cycle, a displacement along the surface to be analyzed.

10. The method according to claim 1, wherein a smoothing of the command signal between the different steps is achieved by means of an electronic filter.

* * * * *